United States Patent [19]

Kronenberg et al.

[11] Patent Number: 5,477,050
[45] Date of Patent: Dec. 19, 1995

[54] RADIATION SENSOR DOSIMETRY CIRCUIT

[75] Inventors: Stanley Kronenberg, Skillman; Arnold Bard, Elberton, both of N.J.

[73] Assignee: The United States of America as represented by the Secretary of the Army, Washington, D.C.

[21] Appl. No.: 260,853

[22] Filed: Jun. 16, 1994

[51] Int. Cl.⁶ .................................................... G01T 1/02
[52] U.S. Cl. ............................... 250/336.1; 250/370.07; 250/390.03
[58] Field of Search .......................... 250/336.1, 370.07, 250/390.03, 374, 369, 376, 378, 377, 370.05

[56] References Cited

U.S. PATENT DOCUMENTS

| | | | |
|---|---|---|---|
| 3,569,704 | 3/1971 | Mitchell | 250/370.07 |
| 4,019,058 | 4/1977 | Kronenberg et al. | |
| 4,163,240 | 2/1979 | Swinehart et al. | 250/390.03 X |
| 4,445,036 | 4/1984 | Selph | 250/390.03 X |
| 4,454,423 | 6/1984 | Koob | 250/374 |
| 4,617,464 | 10/1986 | Kronenberg | 250/376 X |
| 4,721,857 | 1/1988 | Kronenberg | 250/376 X |

FOREIGN PATENT DOCUMENTS

| | | | |
|---|---|---|---|
| 768021 | 9/1980 | U.S.S.R. | 250/370.07 |
| 8705403 | 9/1987 | WIPO | 250/370.07 |

*Primary Examiner*—Carolyn E. Fields
*Assistant Examiner*—Edward J. Glick
*Attorney, Agent, or Firm*—Michael Zelenka; William H. Anderson

[57] ABSTRACT

A radiation sensor of the type that acquires a charge or voltage proportional to a dose of radiation. Upon obtaining a predetermined value to the associated voltage proportional to the dose, the voltage is caused to be discharged. A counter keeps track of the number of discharges which is proportional to the total dose of radiation to which the radiation sensor has been exposed. The radiation sensor is thereby prevented from achieving a high charge or voltage which affects the accuracy of the radiation sensor. A calculator and a clock are used to display the value of the dose in any convenient way, such as in relation to tissue dose or average dose rate for a given period of time.

1 Claim, 4 Drawing Sheets

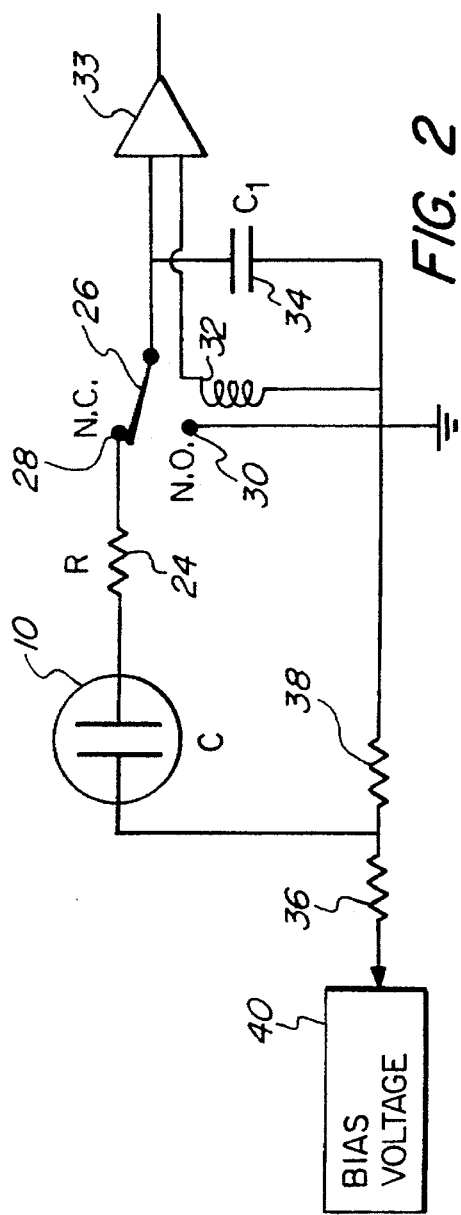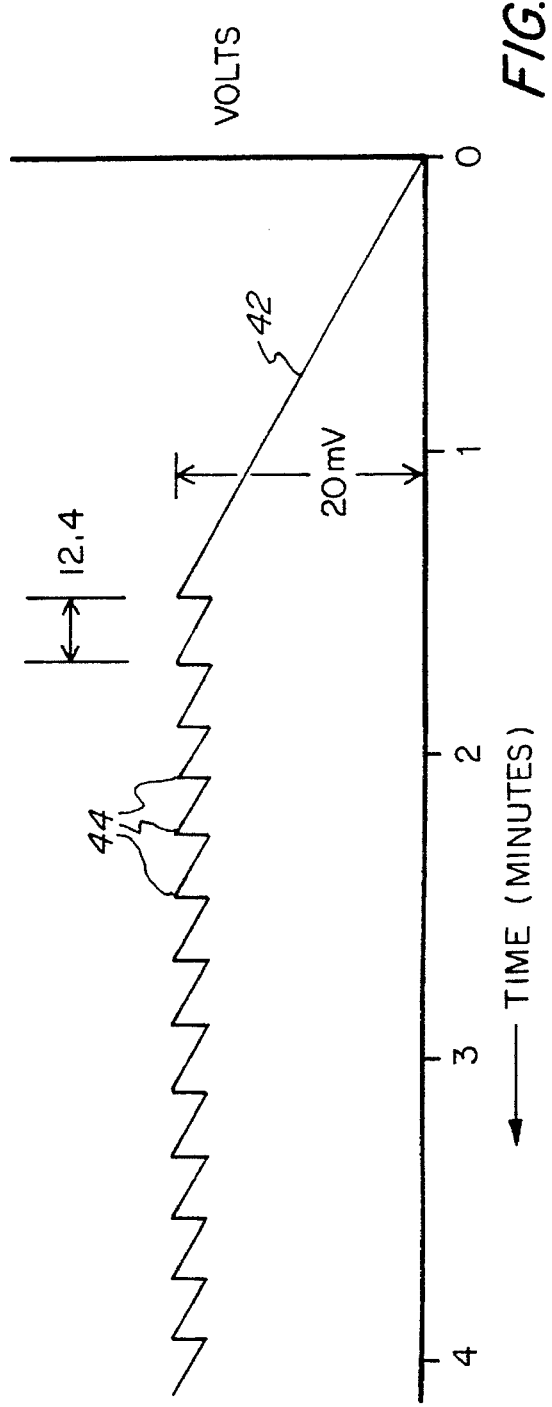

5,477,050

RADIATION SENSOR DOSIMETRY CIRCUIT

GOVERNMENT INTEREST

The invention described herein may be manufactured, used, and licensed by or for the Government for governmental purposes without the payment to us of any royalty thereon.

FIELD OF THE INVENTION

This invention relates generally to detecting radiation dose, and more specifically to a circuit for displaying an accurate dose.

BACKGROUND OF THE INVENTION

There are many instances in which the measurement of the dose of radiation, to which either an individual or equipment is exposed, is desirable. This is particularly important for a commander in a nuclear battle field to determine the radiological status of troops. Besides tactical use in a nuclear battle field, there are many commercial applications in which environments of ionizing radiation intensity occur in which an accumulated dose or dose rate need to be detected and accurately indicated. One type of device used to measure radiation dose is a device made from materials with different atomic numbers resulting in a difference in the probability of production of Compton electrons during exposure to gamma rays. This Compton electron emission is used to measure radiation doses. One such device is disclosed in U.S. Pat. No. 4,019,058 entitled "Charge Transport Tactical Dose Meter", issuing to Kronenberg et al on Apr. 19, 1977, which is herein incorporated by reference. Therein disclosed is a quartz fiber electroscope shunted by a variable capacitor and coupled to a radiation detection capacitor. The radiation detection capacitor is formed of a material of relatively large atomic number and a material of lesser atomic number. An electric charge is induced by neutron or gamma radiation. A variable capacitor is then used to determine the voltage as a result of the induced electric charge. The voltage is proportional to the dose.

This type of radiation sensor is called a proton/electron transfer sensor or, hereinafter, PETS. The operation of a PETS dosimeter for detecting gamma rays can be appreciated as follows. A capacitor whose one electrode is made of a higher atomic number conductor than its other electrode and separated by a thin insulator, when exposed to gamma rays, will cause energetic electrons to be generated. The production of photoelectrons per unit mass of the material is proportional to the atomic number to the fifth power. The production of Compton electrons is proportional to the atomic number. Therefore, more electrons will be produced in the higher atomic number electrode than in the lower atomic number electrode. Many electrons will escape from the electrode where they are generated and will be absorbed in other parts of the capacitor. Their range (when expressed in weight per area) does not depend significantly on atomic number and therefore, the higher atomic number electrode will lose more electrons than gaining electrons. This will result in the higher atomic number electrode acquiring a positive charge and the lower atomic number electrode a negative charge. This charge is proportional to the gamma ray dose.

PETS may also be used to measure fast neutrons. A capacitor having one electrode made of a conductive low atomic number hydrogenous material while its other electrode, separated by a hydrogenous insulator, is made of a conductive low atomic number non-hydrogenous material will detect fast neutrons. The atomic numbers of all the involved materials being similar and low. This device will show a very low response to gamma rays. When exposed to fast neutrons, recoil protons will be generated in the hydrogenous electrode and in the insulator. Some of these recoil protons will escape from the hydrogenous electrode charging it negatively and will be absorbed in the non-hydrogenous electrode charging it positively. The amount of accumulated charge will be proportional to the fast neutron dose.

The sensitivity of both types of PETS, for detecting gamma or neutron radiation, will depend on the area of the electrode, the capacitance of the device, and the distance between electrodes. It should be noted that this system is free of any dose rate saturation effects and thus can be used for steady state as well as pulsed radiation application where short pulses delivered at very high rates are encountered.

While the rate of generation of electric charge on the electrodes of a PET is strictly proportional to the radiation dose rate and the electric charge between the two electrodes, which increases linearly with dose, they are not without inaccuracies. There are inaccuracies and adverse effects in PETS as a result of polarization of the dielectric, ionization, and electric charge leakage. Therefore, there is a need for reliable, more accurate dose information to be derived from radiation sensors that operate as a proton/electron transfer sensor or PETS.

SUMMARY OF THE INVENTION

The present invention is directed to an improved proton/electron transfer sensor and circuit therefor for detecting doses of radiation. The present invention comprises a proton/electron transfer type radiation sensor that acquires a charge or voltage proportional to the radiation exposure, a voltage detector for detecting the acquired voltage, a discharge means for discharging the acquired voltage after a predetermined voltage is reached, counter means for counting the number of times the voltage is discharged from the radiation sensor, and a display means for displaying the dose of radiation the radiation sensor has been exposed to based upon the acquired charge or voltage. A timer may be included to obtain a dose rate in contrast to an overall exposure dose. Additionally, the display of dose may be adjusted or calibrated for a direct reading of tissue dose.

Accordingly, it is an object of the present invention to provide a more accurate radiation sensor not influenced by polarization of the dielectric, ionization, or electric charge leakage.

It is another object of the present invention to provide an inexpensive, dependable dosimeter.

It is an advantage of the present invention that a direct readout is obtained indicative of dose.

It is another advantage of the present invention that it has an unlimited dose range that will not saturate due to high dose rates.

It is yet a further advantage of the present invention that the dosimeter can measure gamma rays and fast neutrons.

It is a feature of the present invention that a discharge means is used for reducing the voltage after a predetermined value of the voltage developed as a result of radiation exposure to minimize adverse polarization effects.

It is a feature of the present invention that a counter is used for counting the number of discharges which is directly proportional to dose.

These and other objects, advantages, and features will become readily apparent in view of the following more detailed description.

BRIEF DESCRIPTION OF THE DRAWINGS

FIG. 2 is a schematic representation of a simple circuit illustrating the present invention.

FIG. 3 is a graphical representation of the output voltage of a circuit embodying the present invention.

DETAILED DESCRIPTION OF THE PREFERRED EMBODIMENT

Figure 1:
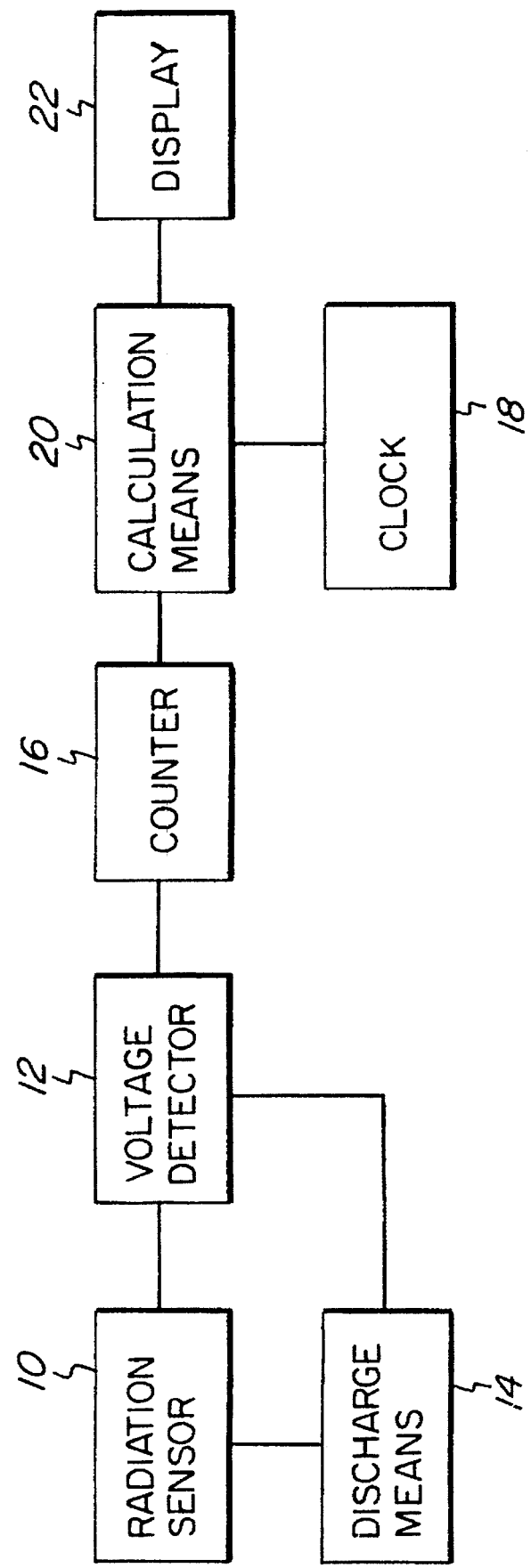
FIG. 1 is a block diagram illustrating the present invention.

FIG. 1 is a block diagram illustrating the present invention. A radiation sensor 10 is coupled to a voltage detector 12. The voltage detector 12 is coupled to a discharge means 14. A counter 16 is coupled to the voltage detector. The counter 16 is coupled to calculation means 20. A clock 18 is coupled to calculation means 20. The calculation means 20 is coupled to a display 22.

The radiation sensor 10 is a proton/electron transfer type sensor or PETS. The structure of the radiation sensor 10 has the form of two electrodes with an insulator therebetween, and thus is a capacitor. A convenient configuration of a radiation sensor 10 is that of two electrodes sandwiched by an insulator in a device that is rolled to form a cylinder. The nature of the electrodes and the insulator depends upon whether the radiation sensor is to detect gamma rays or fast neutrons. In either type of radiation sensor 10, an electric charge and corresponding voltage will develop as a result of the radiation sensor 10 being exposed to either gamma rays or fast neutrons. The charge or voltage is directly proportional to the radiation dose. The choice of thickness of the electrodes, the insulator or dielectric material therebetween, and the thickness of the overall device determines the sensitivity of radiation sensor 10.

The operation of the present invention can readily be appreciated with reference to FIG. 1. When radiation sensor 10 is exposed to radiation, a charge or voltage is developed. This charge or voltage is directly proportional to the dose or exposure to radiation of the radiation sensor 10. Voltage detector 12 detects an increase in voltage caused by the exposure of radiation sensor 10 to a dose of radiation. At a predetermined voltage, discharge means 14 is activated to discharge or drain off the voltage caused by the dose of radiation to which the radiation sensor 10 has been exposed. Counter 16 counts or keeps track of the number of discharges caused by the discharge means 14. The number of discharges counted by the counter 16 is directly proportional to the dose of radiation experienced by the radiation sensor 10. Calculation means 20 calculates a value in any desired unit for display by display 22. Clock 18 is coupled to the calculation means 20 so that a display of a dose rate is obtained if desired. The dose rate can be calculated based on the time interval between the discharges as measured by the counter 16.

Any number of conventional circuits can be easily fabricated to practice the present invention. By way of example only, the following are illustrative circuits embodying the present invention.

FIG. 2 is a schematic representation of a basic circuit for practicing the present invention. A radiation sensor 10 having a capacitance C is attached to a resistor 24. The resistor 24 has a contact 28 at the other end. A switch 26 is used to complete the circuit with resistor 24 or contact 30. A coil 32 is placed adjacent contact 30. A controller 33 is connected to the switch 26 and the coil 32 as well as a capacitor 34 having a capacitance $C_1$. Resistors 36 and 38 are also in the circuit and the radiation sensor 10 is biased by bias voltage 40. In operation, the switch 26 is normally closed contacting contact 28. On exposure to radiation, the radiation sensor 10 will develop a charge charging capacitor 34 resulting in a voltage. When controller 33 detects a predetermined voltage associated with capacitor 34, the controller 33 energizes coil 32 causing switch 26 to close on normally open contact 30. When switch 26 contacts contact 30, the capacitor 34 discharges. The controller 33 then keeps track of this discharge and advances a counter, not shown. After discharging, the switch 26 is placed into the normally closed position contacting contact 28. During continued exposure of radiation by radiation sensor 10, a charge and voltage continues to accumulate on capacitor 34. To prevent the first dose required for the first count from being larger than for subsequent counts, the radiation sensor 10 is biased by bias voltage 40. This assures that all counts will have an equal dose associated therewith. By selecting the predetermined voltage at which the capacitor 34 is discharged, the value for capacitor 34, and the capacitance value of the radiation sensor 10, the dose per count or discharge can be selected at any desired value. A convenient predetermined value for the voltage to reach before discharge has been determined to be in the range of 20 millivolts. If the radiation is delivered in the form of a single high intensity pulse instead of being delivered in the mode of steady state, the voltage on the sensor rises responsively to the delivered dose, and may reach a substantial value. This voltage is then discharged by rapidly occurring steps of 20 mV and the number of these steps is recorded. Although this voltage may achieve a high value, it will not generate an adverse polarization effect in the dielectric because its duration is too short.

FIG. 3 illustrates the increase in voltage over time as a result of exposure of the radiation sensor 10 illustrated in FIG. 2 to radiation. Line 42 represents the voltage value over time. During a constant exposure of radiation, the voltage increases to a predetermined threshold of 20 millivolts. A discharge then takes place, followed by a continued increase of voltage until another discharge occurs. The peaks 44 illustrate successive discharges which, when counted, are directly proportional to the exposure dose of the radiation.

Figure 4:
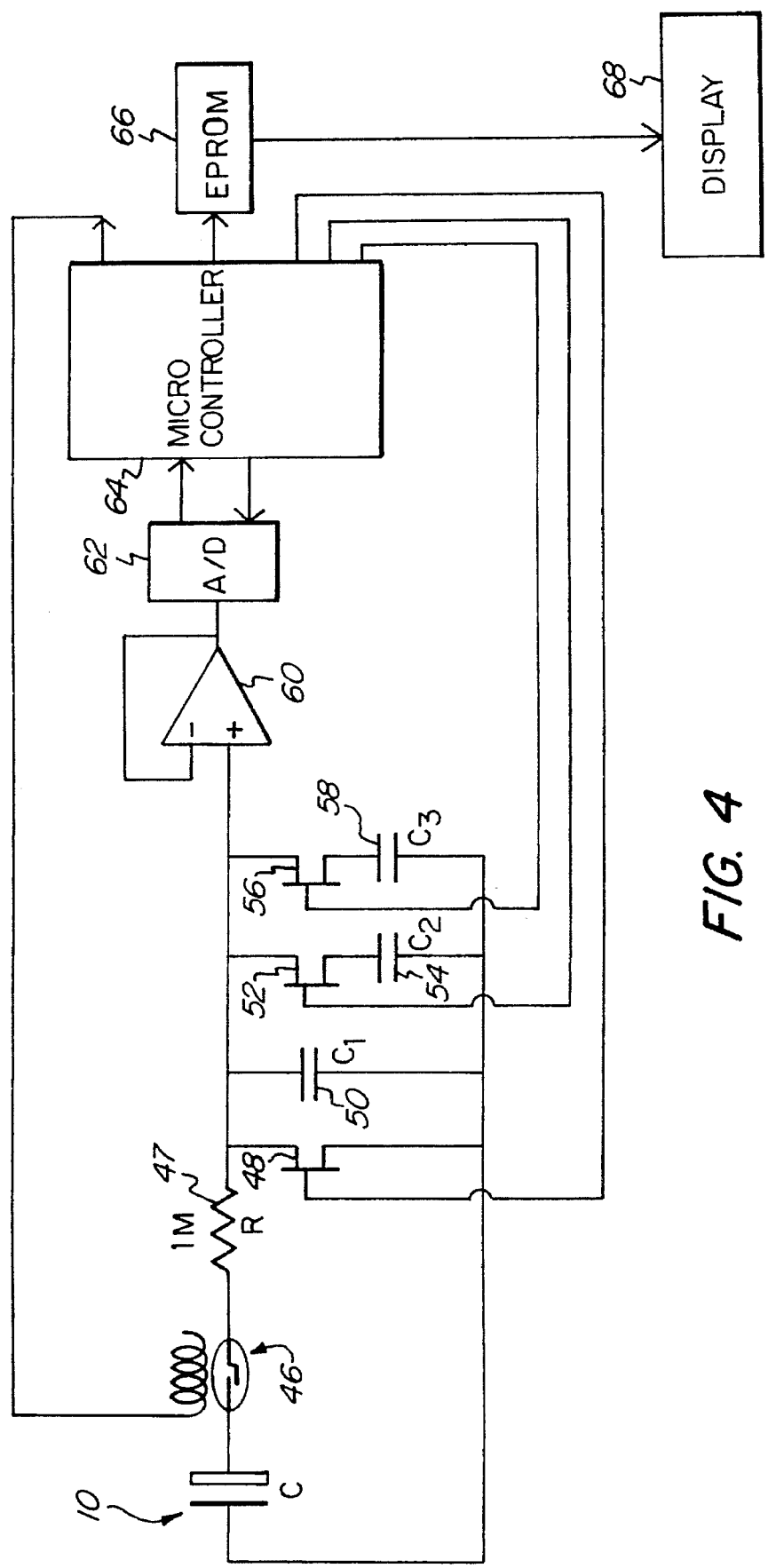
FIG. 4 is a schematic illustration of one embodiment of the present invention.

FIG. 4 illustrates another circuit for practicing the present invention. The radiation sensor 10 is connected to a reed relay 46. The reed relay 46 is connected through a resistor 47 to a series of transistors and capacitors in parallel. Transistor 48 is connected in parallel with capacitor 50 having a value of $C_1$. Transistor 52 is in series with capacitor 54 having a value of $C_2$. Transistor 52 and capacitor 54 are in parallel with transistor 48 and capacitor 50. Transistor 56 is in series with capacitor 58 having a value of $C_3$. Transistor 56 and capacitor 58 are in parallel with transistor 48, capacitor 50 and the series connected transistor 52 and capacitor 54. A buffer amplifier 60 is used between one node of resistor 47 and an analog to digital converter 62. The analog to digital converter is coupled to a micro-controller 64. The micro-controller 64 controls the reed relay 46 and the transistors 48, 52, and 56. The micro-controller 64 is also coupled to a EPROM memory device 66 which in turn is coupled to a display.

In operation, referring to FIG. 2, the micro-controller closes the reed switch 46. Upon radiation sensor 10 being exposed to radiation, a voltage will be generated and builds up through resistor 47 onto capacitor 50. When the voltage of capacitor 50 exceeds a predetermined value, the micro-controller 64 causes transistor 52 to close. The value of capacitor 54 is nine times that of the value of capacitor 50. This causes the voltage to drop by a factor of ten. The voltage will continue climbing as sensor 10 is continued to be exposed to radiation. Should the voltage continue to climb and exceed a predetermined voltage, the micro-controller 64 causes transistor 56 to close. Capacitor 58 has a value ninety times capacitor 50. Therefore, the voltage drops by a factor of ten. As the radiation sensor 10 continues to be exposed to radiation, the voltage continues to climb. When the voltage exceeds another predetermined voltage, the value is stored in memory 66 and the micro-controller 64 causes transistor 48 to close, discharging capacitors 50, 54, and 58. The accumulated dose can then be displayed by display 68 or the dose measurement continued and an accumulating value maintained by memory 66.

Figure 5:
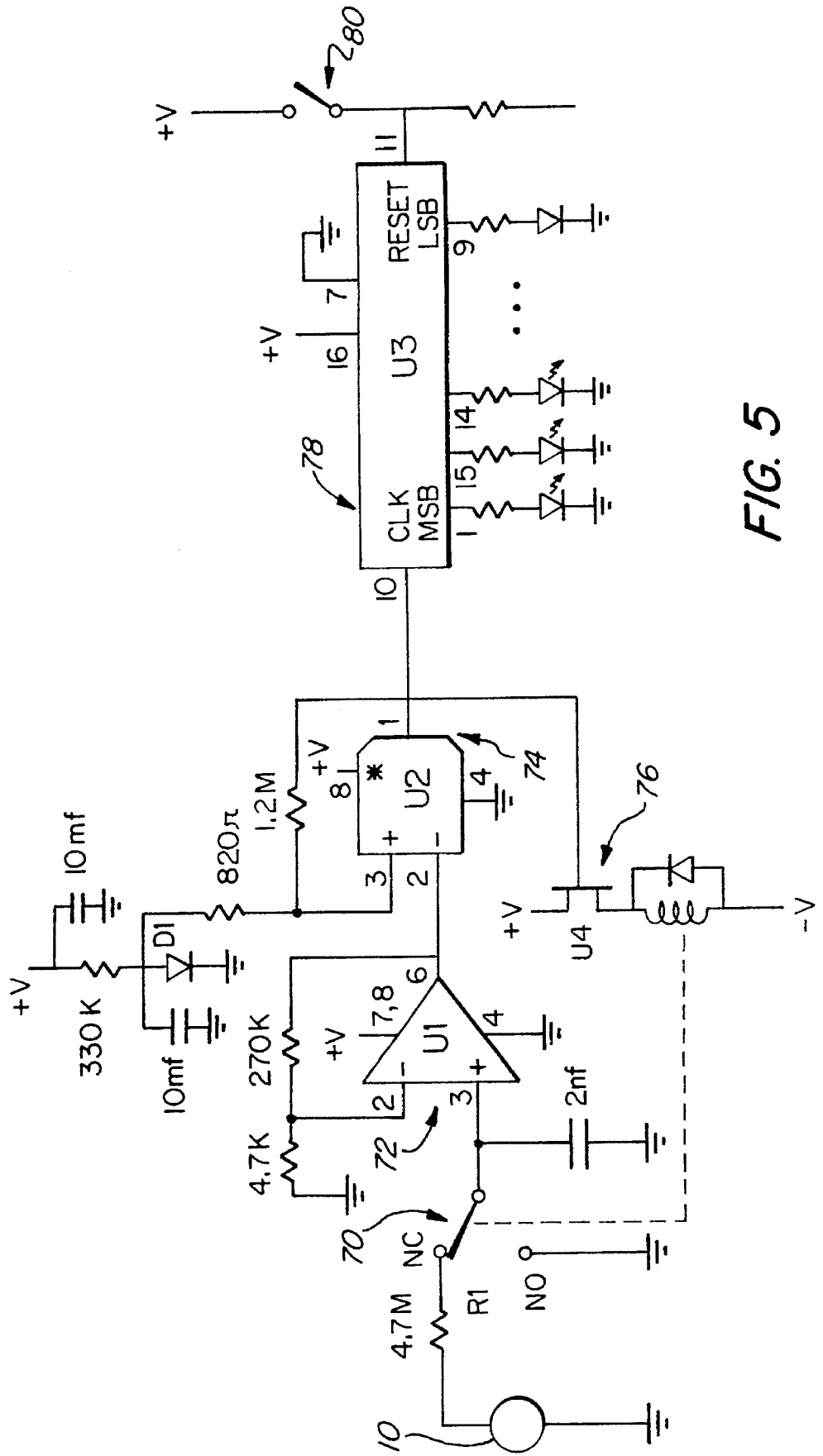
FIG. 5 is a schematic representation of another embodiment of the present invention.

FIG. 5 illustrates another electronic circuit embodying the principals of the present invention. A radiation sensor 10 is connected to a switch 70. Switch 70 is normally closed. Switch 70 couples the radiation sensor 10 to an operational amplifier 72. The operational amplifier 72 in turn is coupled to a dual comparator 74. The dual comparitor is coupled to a switch control 76 and a binary counter 78. The binary counter 78 can be reset by reset switch 80. In operation, when the voltage generated by the radiation sensor 10 obtains a predetermined value, the dual comparator 74 causes the activation of switch control 76 which will discharge a capacitor and advance the binary counter 78. The binary counter 78 keeps track of the number of discharges and thereby is directly proportional to the dose to which the radiation sensor 10 has been exposed.

Accordingly, from the above, it should readily be appreciated that the present invention advances the accuracy and reliability of radiation dose indicators that can be used for measuring and monitoring moderate to high intensity steady state or pulsed radiation. This can be applied to tactical applications as well as commercial applications such as radiation processing plants, including sterilization of medical supplies and materials processing.

Additionally, although the preferred embodiment has been illustrated and described, it will be obvious to those skilled in the art that various modifications may be made without departing from the spirit and scope of this invention.

What is claimed is:

1. A radiation sensor dosimeter circuit comprising:

a capacitive radiation sensor;

a first transistor in parallel with said radiation sensor;

a first capacitor in parallel with said radiation sensor;

a reed switch placed in series with said radiation sensor between said first transistor and said radiation sensor;

a resistor placed in series with said reed switch;

a plurality of transistors in series with a plurality of capacitors placed in parallel with said radiation sensor;

an analog to digital convertor coupled to said radiation sensor, said first transistor, said first capacitor, and each of said plurality of transistors;

a micro-controller coupled to said analog to digital convertor, said micro-controller coupled to and controlling said reed switch, said first transistor, and each of said plurality of transistors;

a memory device coupled to said micro-controller; and a display coupled to said memory device, whereby a charge developed by said radiation sensor upon exposure to radiation is converted to a voltage and detected by said micro-controller.

\* \* \* \* \*